US012053972B2

United States Patent
(12) United States Patent
Rogerson

(10) Patent No.: US 12,053,972 B2
(45) Date of Patent: Aug. 6, 2024

(54) WIPER BLADE FOR PRINTER ROLLER

(71) Applicant: Mark Rogerson, Bishop Auckland (GB)

(72) Inventor: Mark Rogerson, Bishop Auckland (GB)

( * ) Notice: Subject to any disclaimer, the term of this patent is extended or adjusted under 35 U.S.C. 154(b) by 235 days.

(21) Appl. No.: 17/270,471

(22) PCT Filed: Aug. 27, 2019

(86) PCT No.: PCT/GB2019/052388
§ 371 (c)(1),
(2) Date: Feb. 23, 2021

(87) PCT Pub. No.: WO2020/039214
PCT Pub. Date: Feb. 27, 2020

(65) Prior Publication Data

US 2021/0323299 A1 Oct. 21, 2021

(30) Foreign Application Priority Data

Aug. 24, 2018 (GB) ..................................... 1813826

(51) Int. Cl.
*B41F 9/10* (2006.01)
*B41F 35/04* (2006.01)

(52) U.S. Cl.
CPC .......... *B41F 9/1072* (2013.01); *B41F 9/1036* (2013.01); *B41F 35/04* (2013.01); *B41P 2235/21* (2013.01)

(58) Field of Classification Search
CPC ...... B41F 9/1072; B41F 9/1036; B41F 9/109; B41F 35/04; B41P 2235/21
See application file for complete search history.

(56) References Cited

U.S. PATENT DOCUMENTS

2017/0210121 A1 * 7/2017 Rogerson ................ B41F 35/04

FOREIGN PATENT DOCUMENTS

WO WO-2007113492 A2 * 10/2007 .............. B41F 35/02

OTHER PUBLICATIONS

Shigley et al., "Mechanical Engineering Design," 1989 McGraw-Hill, 5th, pp. 157-160 (Year: 1989).*

* cited by examiner

*Primary Examiner* — Matthew G Marini
*Assistant Examiner* — Leo T Hinze
(74) *Attorney, Agent, or Firm* — Kinney & Lange, P.A.

(57) ABSTRACT

A blade assembly of a waste catchment system for a roller having a support plate for attachment to a tray of the waste catchment system and a blade holder. The blade holder configured to receive a blade having a longitudinal axis and a free edge extending in the direction of the longitudinal axis and adapted to engage with the roller to be cleaned. The blade holder configured to receive and retain the blade, the blade being removably attachable to the blade holder. One of the blade holder and blades includes a channel and the other of the blade holder and blade includes a protrusion configured to be seated in and retained within the channel. There is a clearance fit between the channel and the protrusion.

19 Claims, 8 Drawing Sheets

FIG. 3
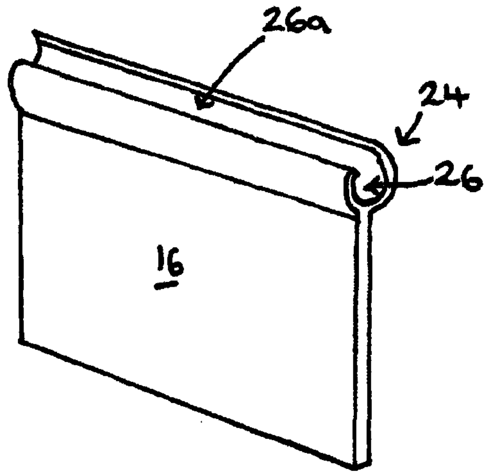
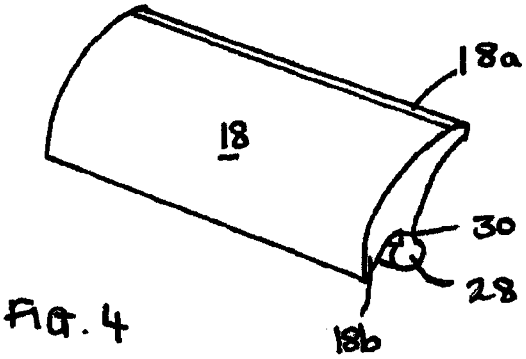
FIG. 4

WIPER BLADE FOR PRINTER ROLLER

FIELD OF THE INVENTION

The present invention relates to a wiper blade for removing waste materials from a roller and in particular from a printer roller.

BACKGROUND OF THE INVENTION

In the printing industry, waste material is removed from rollers using a wiper blade. The wiper blade includes a tip for engaging a rotating roller to scrape any waste material, typically ink, from the roller. Typically, waste material scraped off the roller is directed to a collection tray.

The solvents used in printing inks, along with friction between the roller and wiper blade cause the wiper blades to wear and therefore the blades must be replaced from time to time. Changing the wiper blade can be a time consuming and messy task, and typically involves removing a number of bolts, each of which is likely to need to be cleaned of ink prior to removal. WO 2016/046559, to the present applicant, describes a waste catchment system in which the wiper blade is more easily replaced. The system includes a blade holder which is configured to receive and retain the wiper blade tightly. The blade is removably attachable to the blade holder, either through a push-fit connection, or by sliding one component of the blade into a corresponding channel on the blade holder. However, the solvents used in printing inks, particularly those including halogenated hydrocarbons, can cause the blade to swell over time and the applicants have found that swelling of the wiper blade within the blade holder can cause the tip of the wiper blade to distort, leading to a deterioration in the ability of the wiper blade to remove ink from the roller.

It would be desirable to provide an improved wiper blade assembly.

SUMMARY OF THE INVENTION

According to an aspect of the invention there is provided a blade assembly of a waste catchment system for a roller, the blade assembly comprising a support plate for attachment to a tray of the waste catchment system and a blade holder, the blade holder configured to receive a blade having a longitudinal axis and a free edge extending in the direction of the longitudinal axis and adapted to engage with the roller to be cleaned, wherein the blade holder is configured to receive and retain the blade, the blade being removably attachable to the blade holder, and wherein one of the blade holder and blade includes a channel and the other of the blade holder and blade includes a protrusion configured to be seated in and retained within the channel, characterised in that there is a a clearance fit between the channel and the protrusion.

Preferably, the protrusion has a diameter and the clearance fit between the channel and the protrusion is at least 5% of the diameter of the protrusion, such that the diameter of the channel is at least 5% larger than the diameter of the protrusion. In a preferred example, the diameter of the protrusion is 3.0 mm and the diameter of the channel is 3.4 mm.

Preferably, both the channel and the protrusion have a substantially circular cross-section.

The removable attachment of the blade to the blade holder may be provided by the protrusion being insertable into and removable from the channel by sliding with respect thereto in the longitudinal direction of the blade.

The blade assembly may further comprise blade retaining means associated with the blade holder, said blade retaining means having a first position in which the blade retaining means prevents sliding of the blade relative to the blade holder, and a second position in which the blade may slide relative to the blade holder. Preferably, the blade retaining means is spring mounted to the support plate and biased towards the first position.

The blade holder may include a closed end adapted to limit the said sliding of the blade relative to the blade holder.

Preferably, the blade further comprises a sloping surface extending from the free edge and configured to direct waste material removed from the roller by the blade towards the tray. Preferably, the sloping surface terminates in a substantially flexible lip, and in use the lip presses against the blade holder or a liner located within the tray causing the blade to rotate about its longitudinal axis, pressing the free edge of the blade against the roller.

The blade assembly may be adapted to attach to a liner for lining the tray.

The blade assembly may be attachable to the liner via magnetic means. One of the blade assembly and the liner may be provided with a magnetic element, and the other of the blade assembly and the liner may be provided with a ferromagnetic element. Alternatively, each of the blade assembly and liner may be provided with a magnetic element.

The blade assembly may be attachable to the liner via co-operating male/female elements. The co-operating elements may comprise a channel located on the blade and a protrusion located on the liner.

The invention provides an improved blade assembly of a waste catchment system for a roller, distortion of the blade when the blade swells due to solvent absorption is prevented, lengthening the life of a particular blade, which therefore is required to be changed less frequently.

BRIEF DESCRIPTION OF THE DRAWINGS

In the drawings, which illustrate preferred embodiments of the wiper blade assembly of the invention;

FIG. 3 is an isometric view of the support plate forming part of the wiper blade assembly of FIG. 2;

FIG. 4 is an isometric view of the blade forming part of the wiper blade assembly of FIG. 2;

DETAILED DESCRIPTION OF THE PREFERRED EMBODIMENTS

Figure 1:
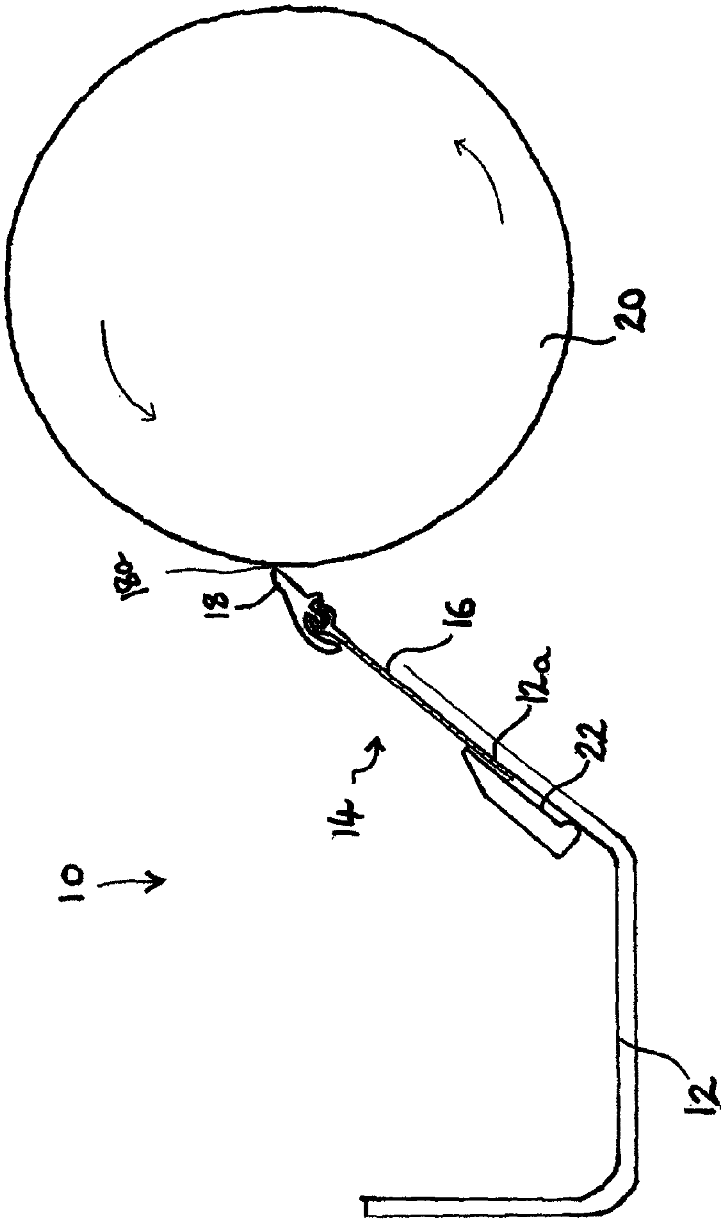
FIG. 1 is a schematic representation of a waste catchment system of the present invention.

Referring to FIG. 1, there is shown a waste catchment system 10 according to the invention, comprising a wash up tray 12 and a blade assembly 14, which comprises a support plate 16 and a blade 18, which scrapes waste material from the roller 20 using the free edge, or tip portion 18*a* for engaging with the surface of the roller 20.

The support plate 16 rests on an inner wall 12*a* of the wash up tray 12 and is attached thereto by a bracket 22.

Figure 2:
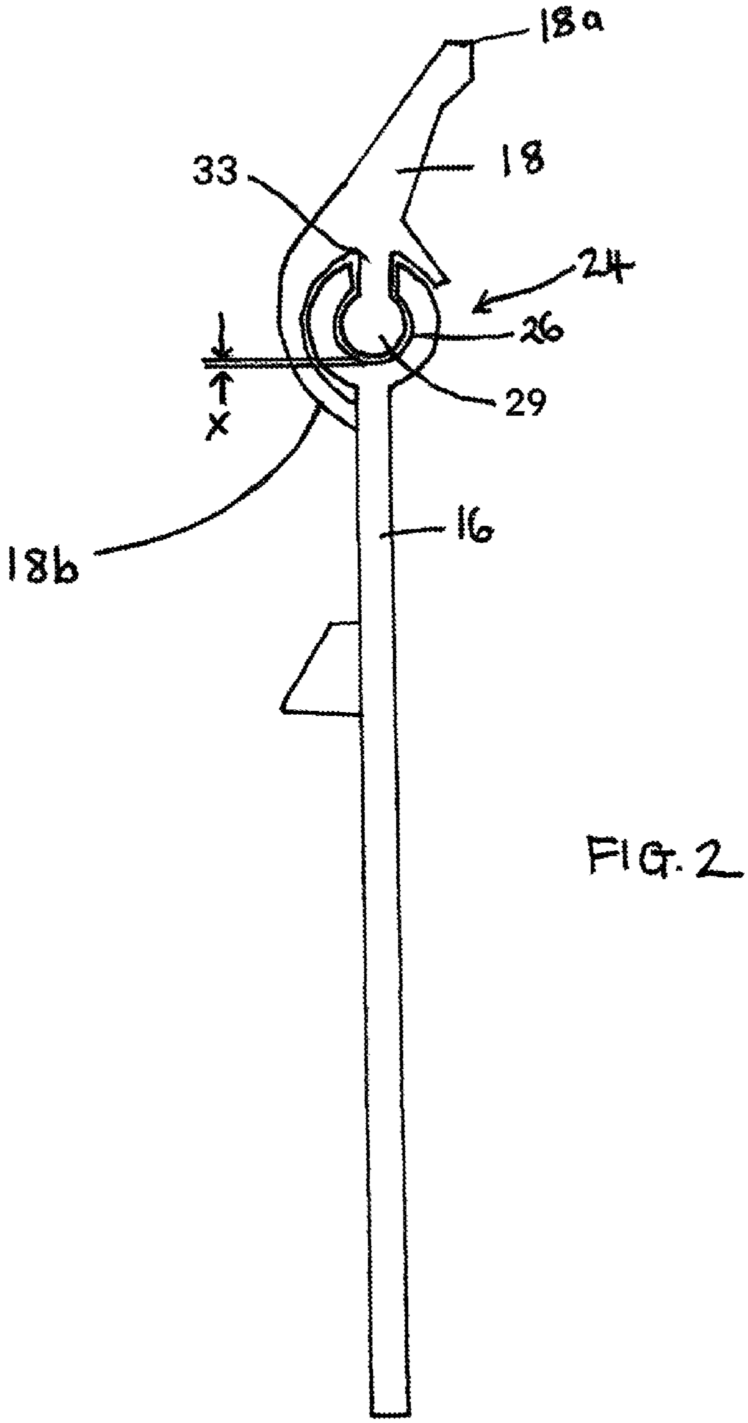
FIG. 2 is a side view of a first embodiment of a wiper blade assembly of the invention.

Referring also to FIGS. 2, 3 and 4, the support plate 16 includes a blade holder 24 that is configured to receive part of the blade 18. The blade holder 24 includes a channel 26 with a substantially circular cross-section. The blade 18 includes a protrusion 29 with a substantially circular cross-section which slides into the channel 26 of the blade holder 24.

As shown more clearly in FIG. 3, the channel 26 includes an elongate opening 26*a* along its upper edge. The width of the opening 26*a* is narrower than the width of the channel 26, and also narrower than the width of the protrusion 29, thereby preventing removal of the blade 18 through the elongate opening 26*a*. The protrusion 29 is connected to the blade 18 by a connecting portion 33 which extends through the opening 26*a* of the channel 26 once the protrusion 29 has been inserted into the channel 26.

The protrusion 29 does not fit tightly into the channel 26 and there is a degree of play, or a clearance fit, between the protrusion 29 and the channel 26. In this example the distance between the channel and the protrusion, X, as shown in FIG. 2, is approximately 0.19 mm. There is also a degree of play or clearance fit between the opening 26*a* of the channel 26 and the connecting portion 33. This degree of play allows the blade 18 to swell (through exposure to solvents) and prevents the tip 18*a* of the blade 18 from distorting, or from becoming jammed within the blade holder. This lengthens the life of a particular blade 18 and blades are therefore required to be changed less frequently.

The blade 18 is made from an extruded plastic, for example HDPE. The extruded plastic is thicker adjacent the blade tip 18*a* which strengthens the blade tip 18*a* and makes it more durable. The blade 18 also includes a lip 18*b* which in use is located immediately adjacent the wash up tray or wash up tray liner. The blade lip 18*b* is thinner than the blade tip 18*a* and is more flexible, allowing for positioning of a wash up tray liner 12' in between the lip 18*b* and the support plate 16, as will be discussed with reference to FIGS. 5 and 6. The lip 18*b* presses against the wash up tray liner 12' and causes the protrusion 29 of the blade 18 to rotate slightly about the longitudinal axis of the channel 26, pressing the top 18*a* against the surface of the roller 20.

Figure 5:
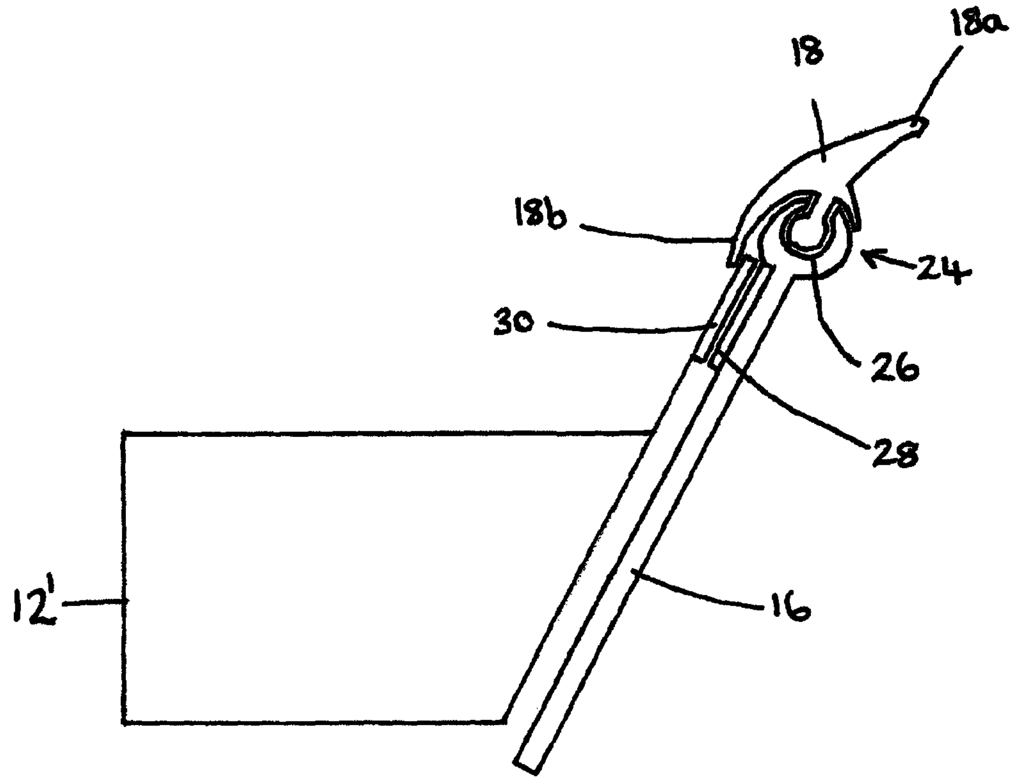
FIG. 5 is a schematic side view of an alternative embodiment of the invention.

FIG. 5 illustrates another alternative embodiment of the wiper blade assembly of the invention. In this example, the blade assembly is of substantially the same design as that shown in FIGS. 1 to 4, except that the blade assembly 14 is attached to the wash up tray liner 12' via magnetic means. At least one of the wash up tray liner 12' and the blade assembly 14 is provided with a magnetic element 28 and where only one of the wash up tray liner 12 and the blade assembly 14 is provided with a magnetic element 28 the other is provided with a ferromagnetic metallic element 30 that is subject to magnetic attraction. In the embodiment illustrated in FIG. 5 the ferromagnetic metallic element 30 is attached to the outer surface of the wash up tray liner 12'. In use, the free end of the wash up tray liner 12' on which the ferromagnetic metallic strip 30 is mounted sits behind and in close proximity to the lip 18*b*. The blade lip 18*b* is thinner and more flexible than the blade tip 18*a*. The ink and solvent collected by the wiper blade 18 will fall from the lip 18*b* onto the inner surface of the wash up tray liner 12' in which it is collected. In the illustrated embodiment, the magnetic element 28 is attached to the blade assembly 14 by adhesive. The aforementioned arrangement for directing the flow of ink and solvent to the wash up tray liner mitigates against such ink and solvent coming into contact with the adhesive holding the magnetic element 28 in place. It is preferred that the magnetic element 28 is a strip corresponding substantially in size to the ferromagnetic metallic strip 30. Note, the magnetic element 28 may be provided on the liner with the ferromagnetic metallic element 30 being provided on, or forming part of the blade assembly.

Figure 6:
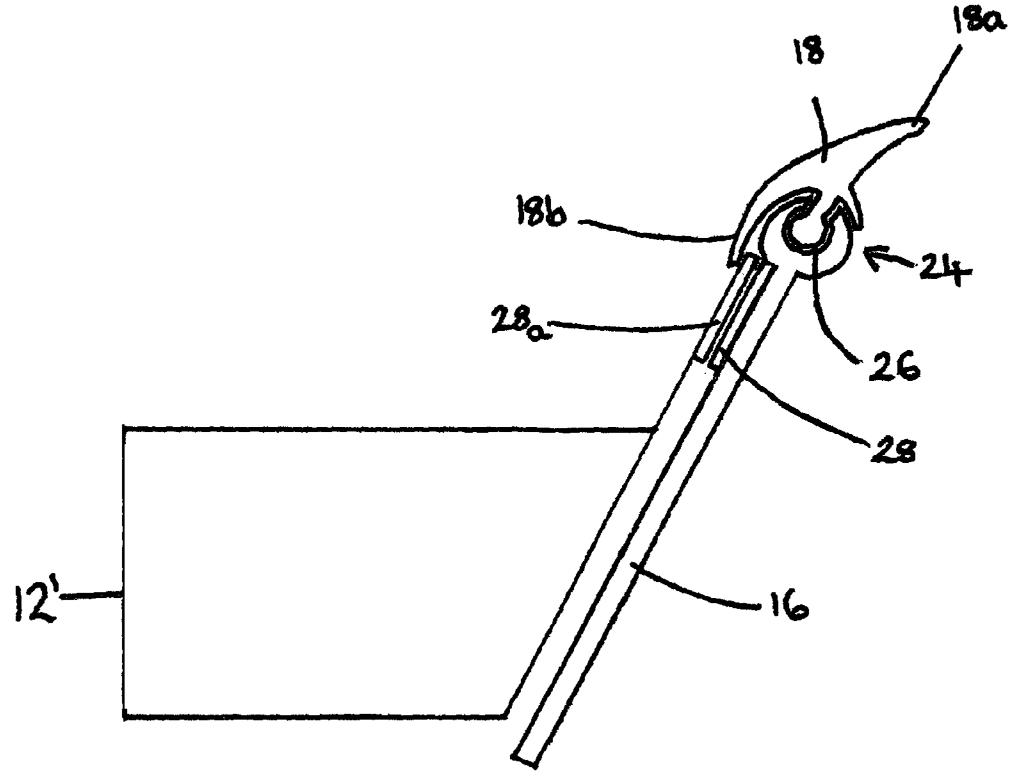
FIG. 6 is a schematic side view of another alternative embodiment of the invention.

It is particularly advantageous that the ferromagnetic metallic strip 30 should also be a magnetic element 28*a*, as illustrated in FIG. 6. In this case, by suitable arrangement of the polarity of the magnetic elements of the wash up tray liner 12' and the blade assembly 14 the components being connected together can be caused to attach to one another such that they are correctly positioned. The magnetic elements 28, 28*a* are provided with alternating polarities and are configured respectively so that the free edge of the wash up tray liner 12' is caused to take up the desired position adjacent the blade lip 18*b*. This is advantageous because if the wash up tray liner is incorrectly positioned, ink and solvent removed by the blade 18 may find its way onto the metallic strip or magnetic element, and this may cause the adhesive attaching the magnetic element and/or metallic strip to the wash-up tray liner or blade assembly to fail. Whilst a person fitting the wash up tray liner 12' to the blade assembly 14 can position a metallic strip 30 correctly, an arrangement that ensures the correct fitting of the wash up tray liner mitigates against human error. The magnetic elements 28, 28*a* are formed of a magnetic tape which may be provided with adhesive to one side thereof for attachment to a surface. It will also be understood that the provision of magnetic elements 28, 28*a* as well as assisting in correct positioning of the free edge of the wash up tray adjacent the blade tip 18*b*, they also provide an obvious indication of incorrect positioning to a fitter, since slight misalignment is not permitted by the magnet polarities. Either the free edge of the wash up tray is correctly positioned, or it is significantly out of position.

Figure 7:
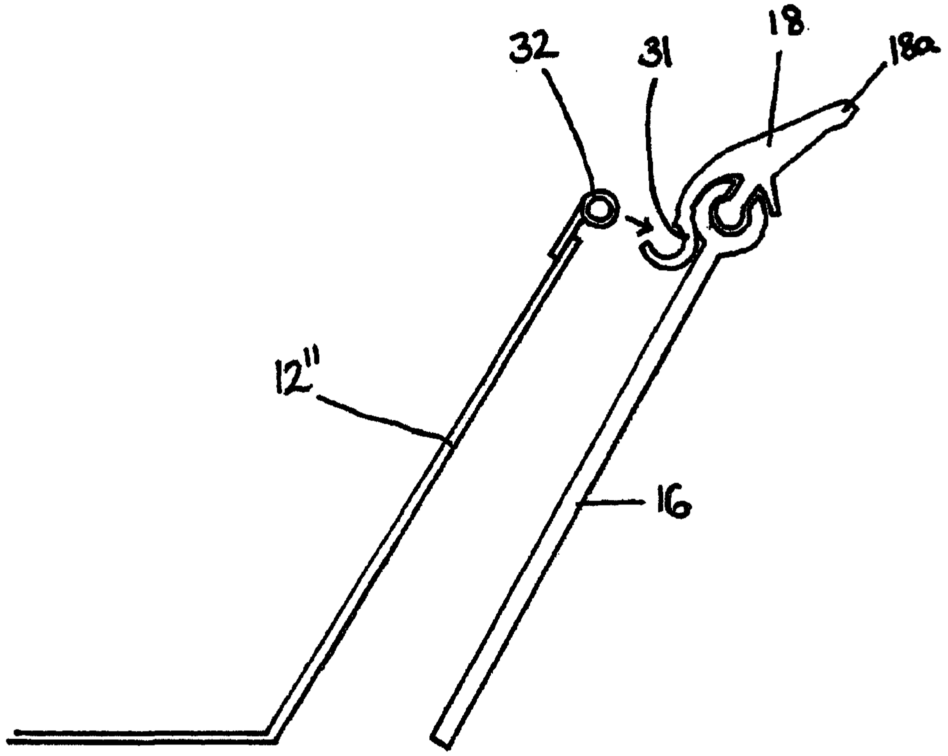
FIG. 7 is a schematic side view of another alternative embodiment of the invention.

FIG. 7 illustrates another alternative embodiment of the wiper blade assembly of the invention. In this example, the blade assembly is of substantially the same design as that shown in FIGS. 1 to 4, except in this example, the blade lip 18*b* is replaced with a channel 31. The channel 31 is adapted to receive and retain a bead portion 32 located on a wash up tray liner 12".

Figure 8A:
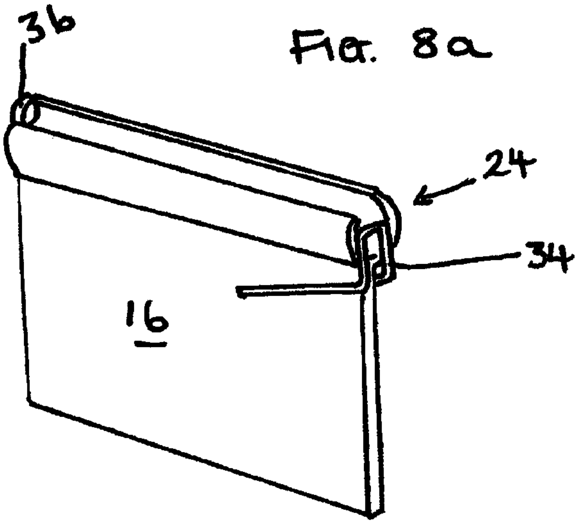
FIG. 8*a* is an isometric view of a support plate forming part of another alternative embodiment of the invention, with a closure member shown in a closed position.
Figure 8B:
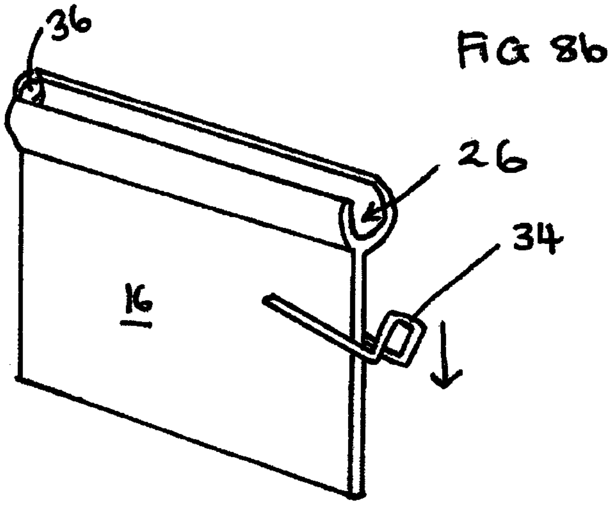
FIG. 8*b* is an isometric view of the support plate of FIG. 8*a*, with the closure member shown in an open position.

As illustrated in FIGS. 8*a* and 8*b*, the support plate 16 and blade holder 24 are preferably provided with a closure member 34. In the illustrated example the closure member 34 is a spring mounted closure member. The closure member 34 is mounted such that in normal operation, it covers the opening of the channel 26 on the blade holder 24. When a blade 18 is in position within the channel 26 the closure member prevents removal of the blade 18.

In order to insert or remove a blade 18 into the blade holder 24, an operator is required to push down on the closure member 34 as shown by the arrow in FIG. 8*b*, moving the closure member 34 away from the opening of the channel 26. When the closure member 34 is released, the spring mounting causes it to move back to its original position (as shown in FIG. 8*a*).

The far end of the blade holder 24 may be closed, for example with a plug or cap 36. This limits the sliding of the blade 18 into the blade holder 24.

Figure 9:
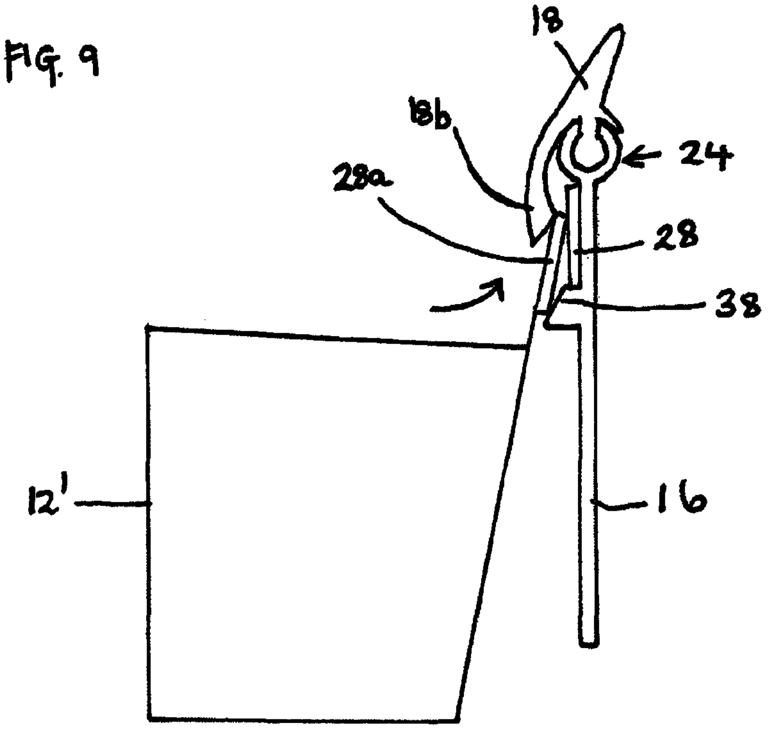
FIG. 9 is a schematic side view of another alternative embodiment of the invention.

As illustrated in FIG. 9, the support plate 16 may include a protruding element 38 with an upwardly sloping face which helps to guide the liner 12' into position underneath the lip 18*b* of the blade 18.

Figure 10:
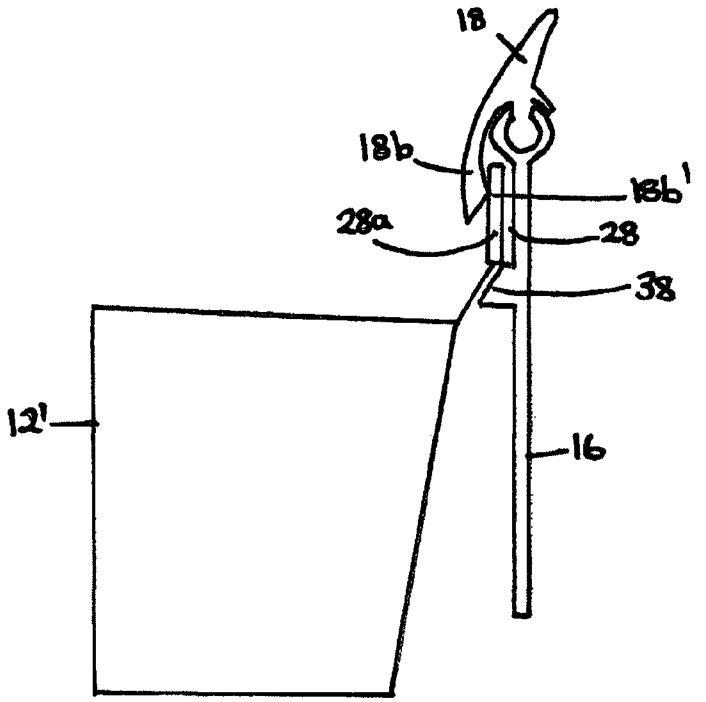
FIG. 10 is a schematic side view of another alternative embodiment of the invention.

As illustrated in FIG. 10, the blade lip 18*b* may engage with the liner or magnet 28*a* at a point 18*b*'. Reducing the surface area of contact between the blade lip 18*b* and the liner and/or magnet 28*a* reduces capillary action of ink and/or solvent back towards the liner/magnet. Capillary action of ink and/or solvent back towards the magnets/liner is undesirable and may cause the blade to become stuck to the liner or the magnet 28*a* forming part of the liner 12'.

The invention claimed is:

1. A blade assembly of a waste catchment system for a roller, the blade assembly comprising a support plate for attachment to a tray of the waste catchment system and a blade holder, the blade holder configured to receive a blade having a longitudinal axis and a free edge extending in the direction of the longitudinal axis and adapted to engage with the roller to be cleaned, wherein the blade holder is configured to receive and retain the blade, the blade being removably attachable to the blade holder, wherein the blade holder includes a channel and the blade includes a protrusion configured to be seated in and retained within the channel, and wherein the channel has a diameter, the protrusion has a diameter, and the diameter of the channel is larger than the diameter of the protrusion.

2. A blade assembly according to claim 1, wherein the diameter of the channel is at least 5% larger than the diameter of the protrusion.

3. A blade assembly according to claim 1, wherein both the channel and the protrusion have a substantially circular cross-section.

4. A blade assembly according to claim 1, wherein removable attachment of the blade to the blade holder is provided by the protrusion being insertable into and removable from the channel by sliding with respect thereto in the longitudinal direction of the blade.

5. A blade assembly according to claim 4 wherein the blade holder includes a closed end adapted to limit the said sliding of the blade relative to the blade holder.

6. A blade assembly according to claim 1, further comprising blade retaining means associated with the blade holder, said blade retaining means having a first position in which the blade retaining means prevents sliding of the blade relative to the blade holder, and a second position in which the blade may slide relative to the blade holder.

7. A blade assembly according to claim 6, wherein the blade retaining means is spring mounted to the support plate and biased towards the first position.

8. A blade assembly according to claim 1, wherein the blade further comprises a sloping surface extending from the free edge and configured to direct waste material removed from the roller by the blade towards the tray.

9. A blade assembly according to claim 8, wherein the sloping surface terminates in a substantially flexible lip, and wherein, in use, the lip presses against the blade holder or a liner located within the tray and causes the blade to rotate about its longitudinal axis, pressing the free edge of the blade against the roller.

10. A blade assembly according to claim 1, wherein the blade assembly is adapted to attach to a liner for lining the tray.

11. A blade assembly according to claim 10, wherein the blade assembly is attachable to the liner via magnetic means.

12. A blade assembly according to claim 11, wherein one of the blade assembly and the liner is provided with a magnetic element, and the other of the blade assembly and the liner is provided with a ferromagnetic element.

13. A blade assembly according to claim 11, wherein each of the blade assembly and liner is provided with a magnetic element.

14. A blade assembly according to claim 10, wherein the blade assembly is attachable to the liner via co-operating male/female elements.

15. A blade assembly according to claim 14, wherein the co-operating elements comprise a channel located on the blade and a protrusion located on the liner.

16. A blade assembly of a waste catchment system for a roller, the blade assembly comprising a support plate for attachment to a tray of the waste catchment system and a blade holder, the blade holder configured to receive a blade having a longitudinal axis and a free edge extending in the direction of the longitudinal axis and adapted to engage with the roller to be cleaned, wherein the blade holder is configured to receive and retain the blade, the blade being removably attachable to the blade holder, wherein one of the blade holder and blade includes a channel and the other of the blade holder and blade includes a protrusion configured to be seated in and retained within the channel, and wherein the channel has a diameter, the protrusion has a diameter, and the diameter of the channel is larger than the diameter of the protrusion, the blade assembly further comprising:

retaining means associated with the blade holder, said blade retaining means having a first position in which the blade retaining means prevents sliding of the blade relative to the blade holder, and a second position in which the blade may slide relative to the blade holder.

17. A blade assembly according to claim 16, wherein the blade retaining means is spring mounted to the support plate and biased towards the first position.

18. A blade assembly of a waste catchment system for a roller, the blade assembly comprising a support plate for attachment to a tray of the waste catchment system and a blade holder, the blade holder configured to receive a blade having a longitudinal axis and a free edge extending in the direction of the longitudinal axis and adapted to engage with the roller to be cleaned, wherein the blade holder is configured to receive and retain the blade, the blade being removably attachable to the blade holder, wherein one of the blade holder and blade includes a channel and the other of the blade holder and blade includes a protrusion configured to be seated in and retained within the channel, and wherein the channel has a diameter, the protrusion has a diameter, and the diameter of the channel is larger than the diameter of the protrusion;

wherein the blade assembly is adapted to attach to a liner for lining the tray; and wherein the blade assembly is attachable to the liner via co-operating male/female elements.

19. A blade assembly according to claim 18, wherein the co-operating elements comprise a channel located on the blade and a protrusion located on the liner.

* * * * *